(12) United States Patent
Saxe et al.

(10) Patent No.: US 11,018,413 B2
(45) Date of Patent: May 25, 2021

(54) APPARATUS COMPRISING AN ANTENNA AND A GROUND PLANE, AND A METHOD OF MANUFACTURE

(75) Inventors: Christian Saxe, Copenhagen East (DK); Martin Feilberg Hansen, Kobenhanv O (DK); Olle Henrik Linden, Hollviken (SE); Rasmus Vistisen, Copenhagen K (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/367,407

(22) PCT Filed: Dec. 22, 2011

(86) PCT No.: PCT/IB2011/055906
§ 371 (c)(1),
(2), (4) Date: Jun. 20, 2014

(87) PCT Pub. No.: WO2013/093563
PCT Pub. Date: Jun. 27, 2013

(65) Prior Publication Data
US 2015/0288053 A1    Oct. 8, 2015

(51) Int. Cl.
*H01Q 1/24*     (2006.01)
*H01Q 9/42*     (2006.01)
*H01Q 21/28*    (2006.01)
*H01Q 1/40*     (2006.01)
*H04M 1/02*     (2006.01)
(Continued)

(52) U.S. Cl.
CPC .............. *H01Q 1/243* (2013.01); *H01Q 1/02* (2013.01); *H01Q 1/40* (2013.01); *H01Q 1/50* (2013.01); *H01Q 9/42* (2013.01); *H01Q 21/28* (2013.01); *H04M 1/0202* (2013.01); *H04M 1/026* (2013.01); *H04M 1/0264* (2013.01); *Y10T 29/49018* (2015.01)

(58) Field of Classification Search
CPC ............. H01Q 1/243; H01Q 1/50; H01Q 9/42
USPC .................... 343/702, 846, 848, 872, 873
See application file for complete search history.

(56) References Cited

U.S. PATENT DOCUMENTS 4,123,756 A    10/1978    Nagata et al. ................. 343/702
5,532,506 A *   7/1996    Tserng ................. H01L 23/3672
                                                        257/276
(Continued)

FOREIGN PATENT DOCUMENTS

CN          1426254 A      6/2003
CN        101911381 A     12/2010
(Continued)

OTHER PUBLICATIONS

Heberling, Dirk, "Modern Trends in the Development of Small and Handy Antennas", © 2001 IEEE, 6 pgs.

*Primary Examiner* — Ab Salam Alkassim, Jr.
(74) *Attorney, Agent, or Firm* — Harrington & Smith

(57) ABSTRACT

An apparatus including a portion of a first external housing sidewall; an antenna at least partially encapsulated by the portion of the first external housing sidewall; a portion of a second external housing sidewall opposing the first external housing sidewall; an internal rigid chassis extending laterally from within the portion of a first housing sidewall to within the portion of the second housing sidewall, wherein the rigid chassis provides a ground plane for the antenna.

15 Claims, 3 Drawing Sheets

Figure 1:
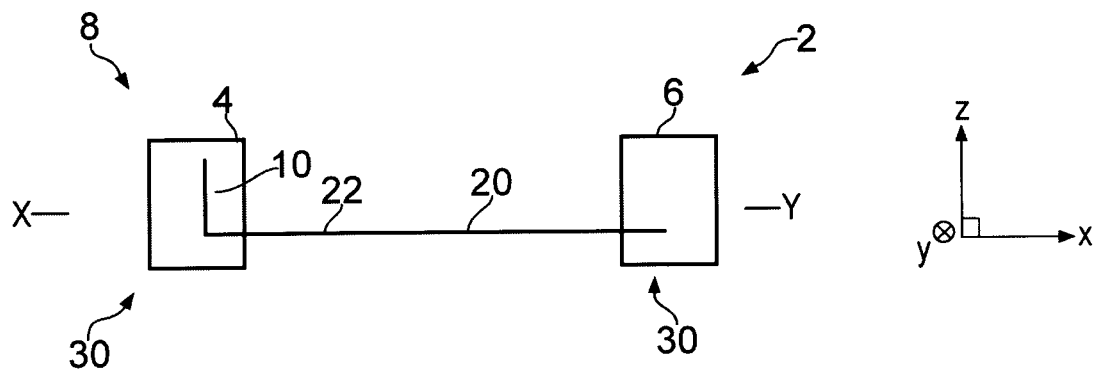

(51) Int. Cl.
*H01Q 1/02* (2006.01)
*H01Q 1/50* (2006.01)

(56) References Cited

U.S. PATENT DOCUMENTS

| | | | | |
|---|---|---|---|---|
| 5,946,194 | A * | 8/1999 | Dudas | H05K 1/0218 174/365 |
| 6,031,505 | A * | 2/2000 | Qi | H01Q 1/243 343/725 |
| 7,486,243 | B2 * | 2/2009 | Wulff | B29C 45/14639 343/702 |
| 7,541,992 | B2 * | 6/2009 | Murakami | H01Q 1/243 343/702 |
| 8,203,493 | B2 * | 6/2012 | Sato | H01Q 1/243 343/702 |
| 8,314,590 | B2 * | 11/2012 | Chen | H02J 7/0011 320/112 |
| 8,638,266 | B2 * | 1/2014 | Liu | H01Q 13/106 343/767 |
| 8,754,815 | B2 * | 6/2014 | Leem | H01Q 1/243 343/702 |
| 8,952,860 | B2 * | 2/2015 | Li | H01Q 1/243 343/702 |
| 9,096,029 | B2 * | 8/2015 | Sung | B29C 45/14065 |
| 9,153,856 | B2 * | 10/2015 | Rappoport | H01Q 1/243 |
| 9,300,055 | B2 * | 3/2016 | Tseng | H01Q 21/28 |
| 10,361,479 | B2 * | 7/2019 | Montevirgen | H01Q 1/04 |
| 2004/0051672 | A1 * | 3/2004 | Nevermann | H01Q 1/243 343/702 |
| 2006/0061512 | A1 * | 3/2006 | Asano | G06F 1/1616 343/702 |
| 2006/0220962 | A1 * | 10/2006 | d'Hont | H01Q 1/50 343/700 MS |
| 2006/0232484 | A1 * | 10/2006 | Wulff | H01Q 5/371 343/702 |
| 2007/0040755 | A1 * | 2/2007 | Na | H01Q 1/243 343/702 |
| 2008/0165065 | A1 * | 7/2008 | Hill | H01Q 1/243 343/702 |
| 2009/0002242 | A1 * | 1/2009 | Lasarov | H01Q 1/243 343/702 |
| 2009/0015490 | A1 | 1/2009 | Honda et al. | 343/702 |
| 2009/0040115 | A1 * | 2/2009 | Zhang | H01Q 1/243 343/702 |
| 2009/0153411 | A1 * | 6/2009 | Chiang | H01Q 1/243 343/702 |
| 2009/0315781 | A1 * | 12/2009 | Tsai | H01Q 1/243 343/700 MS |
| 2010/0039347 | A1 * | 2/2010 | Chen | B29C 45/14065 343/873 |
| 2010/0053002 | A1 * | 3/2010 | Wojack | H01Q 1/243 343/702 |
| 2010/0102131 | A1 | 4/2010 | Skowronek | 235/492 |
| 2010/0123632 | A1 * | 5/2010 | Hill | H01Q 13/16 343/702 |
| 2010/0231481 | A1 * | 9/2010 | Chiang | H01Q 1/243 343/898 |
| 2010/0246137 | A1 | 9/2010 | Magana et al. | 361/713 |
| 2010/0277377 | A1 * | 11/2010 | Sato | H01Q 1/38 343/702 |
| 2010/0302110 | A1 * | 12/2010 | Leem | H01Q 1/243 343/702 |
| 2011/0003623 | A1 * | 1/2011 | Na | H01Q 7/00 455/575.1 |
| 2011/0193758 | A1 * | 8/2011 | Liu | H01Q 13/106 343/767 |
| 2011/0304511 | A1 * | 12/2011 | Fan | H01Q 1/405 343/702 |
| 2012/0178503 | A1 * | 7/2012 | Merz | H01Q 1/2266 455/566 |
| 2012/0229352 | A1 * | 9/2012 | Hsiung | H01Q 1/243 343/702 |
| 2012/0249378 | A1 * | 10/2012 | Li | H01Q 9/42 343/702 |
| 2013/0076573 | A1 * | 3/2013 | Rappoport | H01Q 1/243 343/702 |
| 2014/0246965 | A1 * | 9/2014 | Windeballe | H04M 1/0202 312/223.1 |
| 2015/0004442 | A1 * | 1/2015 | Saxe | H01M 10/425 429/8 |
| 2016/0087329 | A1 * | 3/2016 | Rappoport | H01Q 1/243 343/702 |

FOREIGN PATENT DOCUMENTS

| | | |
|---|---|---|
| EP | 1873863 A2 | 1/2008 |
| EP | 2262053 A1 | 12/2010 |
| GB | 2 439 601 A | 1/2008 |
| WO | WO-2007/-97684 A1 | 8/2007 |
| WO | WO 2008/069750 A1 | 6/2008 |
| WO | WO-2010/025023 A2 | 3/2010 |
| WO | WO 2010/120160 A2 | 10/2010 |
| WO | WO 2011/076118 A | 6/2011 |

\* cited by examiner

APPARATUS COMPRISING AN ANTENNA AND A GROUND PLANE, AND A METHOD OF MANUFACTURE

An apparatus comprising an antenna and a ground plane, and a method of manufacture.

TECHNOLOGICAL FIELD

Embodiments of the present invention relate to an apparatus comprising an antenna and a ground plane for the antenna, and a method of manufacture.

BACKGROUND

An antenna may be used in combination with a ground plane as an internal antenna arrangement of a device.

However, the respective positioning of the antenna and ground plane in an interior of a device can be problematic as it may significantly constrain where other components of the device are positioned.

BRIEF SUMMARY

According to various, but not necessarily all, embodiments of the invention there is provided an apparatus comprising: a portion of a first external housing sidewall; an antenna at least partially encapsulated by the portion of the first external housing sidewall; a portion of a second external housing sidewall opposing the first external housing sidewall; and an internal rigid chassis extending laterally from within the portion of a first housing sidewall to within the portion of the second housing sidewall, wherein the rigid chassis provides a ground plane for the antenna.

According to various, but not necessarily all, embodiments of the invention there is provided a method comprising: providing a rigid chassis and an antenna configured to use the rigid chassis as a ground plane; forming a portion of a first external housing sidewall over at least some of said antenna and at least a first extremity of the rigid chassis forming a portion of a second external housing sidewall over at least a second extremity of the rigid chassis, wherein the second external housing sidewall opposes the first external housing sidewall and the rigid chassis extends internally from within the portion of a first housing sidewall to within the portion of a second housing sidewall.

BRIEF DESCRIPTION

Figure 2:
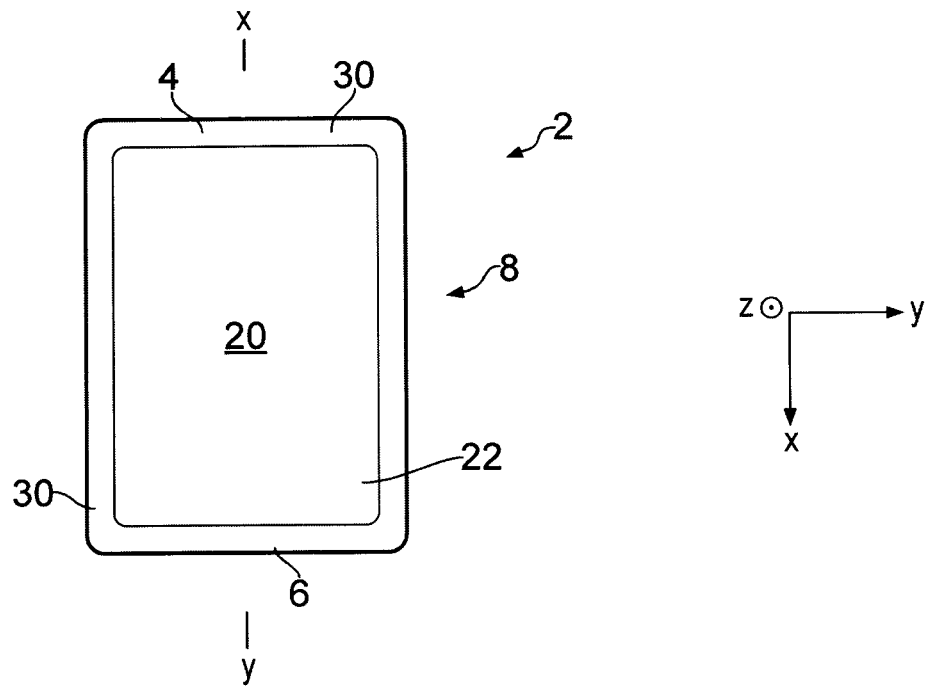

For a better understanding of various examples of embodiments of the present invention reference will now be made by way of example only to the accompanying drawings in which:

FIG. 1 schematically illustrates a cross-section of a module;

FIG. 2 schematically illustrates a module in plan view

Figure 3:
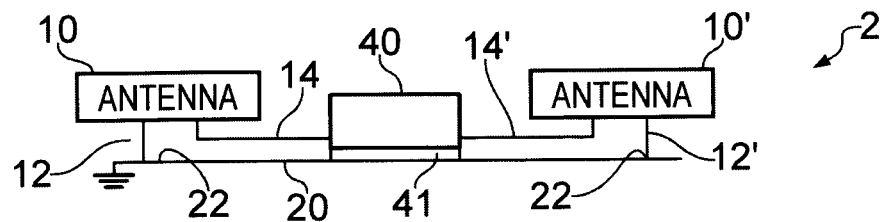
Figure 4:
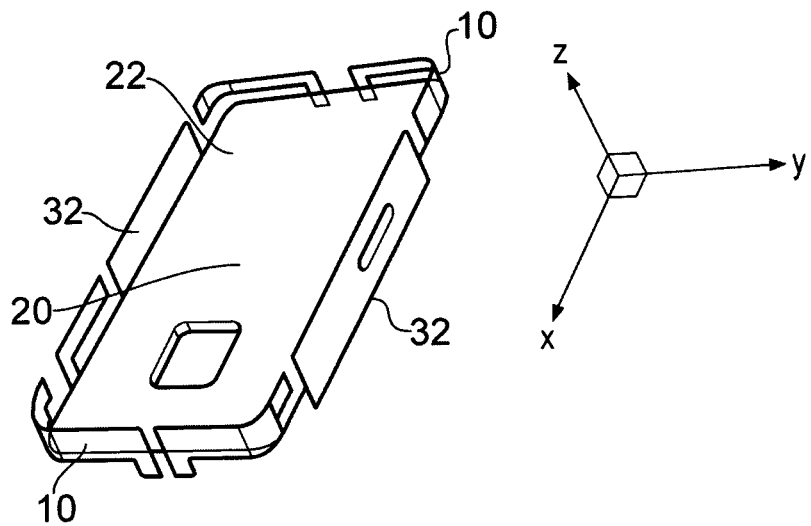
Figure 5:
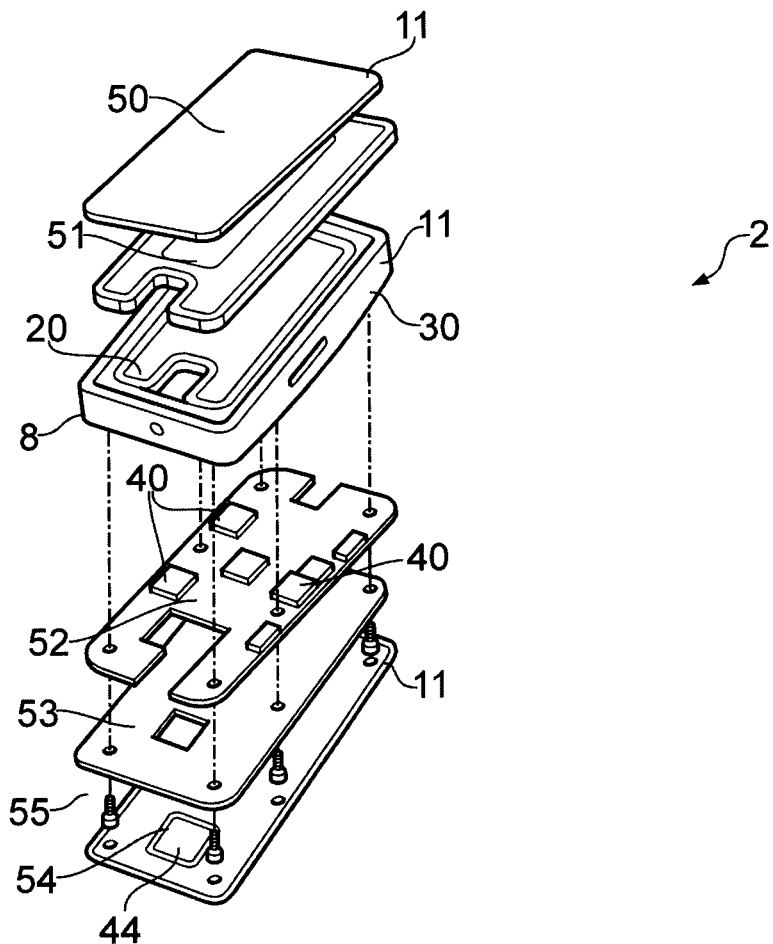
Figure 6:
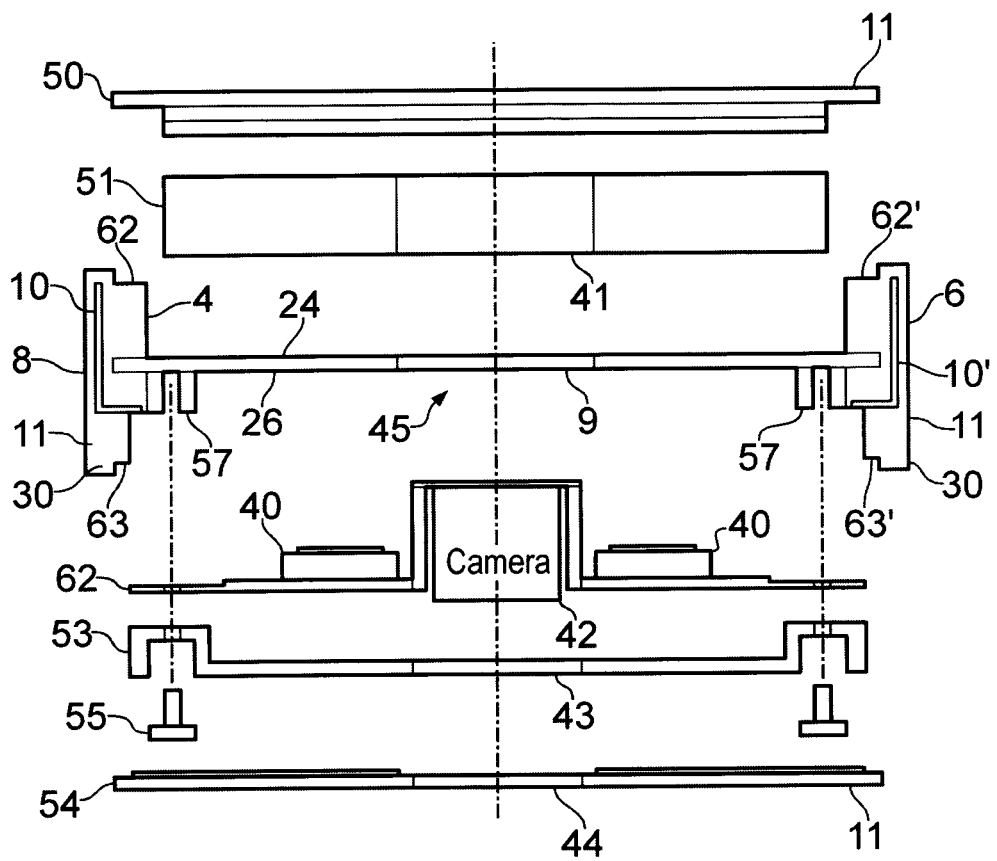
Figure 7:
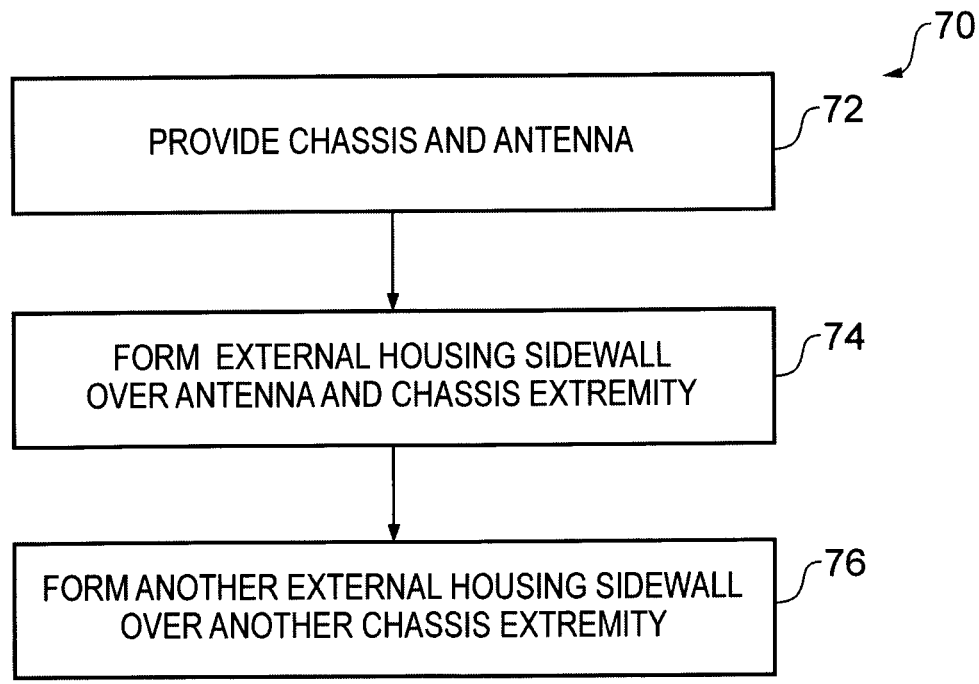

FIG. 3 schematically illustrates an example where the module is incorporated within a larger apparatus;

FIG. 4 schematically illustrates an example of internal rigid chassis before a module is formed by adding sidewalls;

FIGS. 5 and 6 illustrated an exploded view of an apparatus in which the components of the apparatus are separated for clarity. FIG. 5 provides a perspective view and FIG. 6 provides a cross-sectional view; and FIG. 7 schematically illustrates a method for manufacturing a module.

DETAILED DESCRIPTION

The Figures illustrate an apparatus 2 comprising: a portion of a first external housing sidewall 4; an antenna 10 at least partially encapsulated by the portion of the first external housing sidewall 4; a portion of a second external housing sidewall 6 opposing the first external housing sidewall 4; an internal rigid chassis 20 extending laterally from within the portion of a first housing sidewall 4 to within the portion of the second housing sidewall 6, wherein the rigid chassis 20 provides a ground plane for the antenna 10.

FIG. 1 schematically illustrates a cross-section X-Y of an apparatus 2. In this example, the apparatus 2 is a module 8 which can be incorporated into a larger apparatus.

In this example, the apparatus 2 is a chassis-sidewall-antenna module 8 that combines as a single component a structurally supportive rigid internal chassis 20, external housing sidewalls 30 that are fixedly supported by the rigid chassis 20 and an antenna 10 that is at least partially encapsulated by the external sidewalls 30.

The chassis 20 is 'internal' because when the module 8 is incorporated into a larger apparatus, the chassis is positioned in the interior, not the exterior, of that larger apparatus.

The chassis 20 is rigid. This provides structural support to the sidewalls 30 keeping them at fixed relative positions and, may provide structural support for the larger apparatus, keeping components of the larger apparatus at fixed relative positions.

The sidewalls 30 of the component 8 are 'external housing' sidewalls because when the component 8 is incorporated into the larger apparatus, the sidewalls 30 provide sidewall portions of the exterior housing of the larger apparatus.

The sidewalls 30 provide a dual purpose, not only are they sidewall portions of the exterior housing of the larger apparatus but they also encapsulate one or more antennas that may be used by the larger apparatus for wireless communication.

Referring to FIG. 1, sidewalls 30 have a portion of a first external housing sidewall 4 and a portion of a second external housing sidewall 6 opposing the first external housing sidewall 4.

An antenna 10 is at least partially encapsulated by the portion of the first external housing sidewall 4.

An internal rigid chassis 20 extends laterally, in a plane parallel to the x-y plane, from within the portion of a first housing sidewall 4 to within the portion of the second housing sidewall 6. The x-y plane is defined by the mutually orthogonal axes x-y-z.

The sidewalls 30, including the portion of the first sidewall 4 and the portion of the second sidewall 6 may be formed by injection molding. The sidewalls 30 may be formed from an insulating material such as plastics. As an example, the sidewalls may be formed from a synthetic polymer that becomes rigid after injection molding.

The sidewalls 30 may at least partially encapsulate one or more antennas 10. For example, the insulating material of the sidewalls 30 may cover and contact the one or more antennas 10 sealing them within a surrounding, supporting rigid structure. An antenna 10 may comprise one or more radiator portions, one or more radio frequency feeds 14 and, depending upon antenna type, none, one or more ground feeds 12. The insulating material of the sidewalls 30 may cover and contact the whole of the radiator portion(s) sealing it within a surrounding, supporting rigid structure. However, the radio frequency feed(s) 14 (and ground feed(s) 12, if present) may remain exposed. For example, in some but not necessary all embodiments, the only part or parts of the one or more antennas 10 which are left unsealed are a portion of a ground feed 12 and a portion of a radio frequency feed 14, as discussed below with reference to FIG. 3.

The rigid chassis 20 provides a ground plane for the one or more antennas 10. It may also function as a heat sink for heat generating components (not illustrated in FIG. 1).

The rigid chassis 20 comprises an electrically conductive portion 22 which is used as the ground plane.

The conductive portion 22 is also thermally conductive and may be used as a heat sink.

In some embodiments the rigid chassis 20 may be formed from rigid conductive material such as, for example, a sheet of metal.

The antenna 10 may lie in a plane (y-z plane) that is substantially orthogonal to a plane (x-y plane) occupied by the conductive portion 22 of the rigid chassis 20. At least a part of the antenna 10 may thus form a sidewall portion of the internal rigid chassis 20 that is encapsulated by the sidewalls 30.

The antenna 10 may be formed as an extension of the conductive portion 22 of the internal rigid chassis 20. For example, the antenna 10 and the internal rigid chassis 20 may be formed from a common, deformed and patterned rigid conductive element such as, for example, a sheet of metal. This makes manufacture more cost effective and module 8 easier to manufacture. The thickness of the metal sheet may be chosen to provide a desired level of strength and rigidity. The metal sheet may be the same thickness throughout. Alternatively, the portion of the metal sheet that forms the antenna 10 may be thinner than the portion that forms the internal rigid chassis 20.

Alternatively, the internal rigid chassis 20 may be die cast (with or without milling) with the antenna 10 provided as a metal sheet.

Alternatively, the internal rigid chassis 20 may be forged (with or without milling) with the antenna 10 provided as a metal sheet.

FIG. 2 provides a plan view of a module 8. The module illustrated in FIG. 2 may be different to or the same as the module 8 illustrated in FIG. 1. If they are the same, the cross-section illustrated in FIG. 1 is taken along the section X-Y illustrated in FIG. 2.

The mutually orthogonal axes x-y-z in FIGS. 1 and 2 illustrate the relative orientations of the views illustrated in the Figs.

In FIG. 2, the external housing sidewalls 30 circumscribe the internal rigid chassis 20. The external sidewalls 30 extend all the way around a perimeter of the internal rigid chassis 20. The perimeter of the internal rigid chassis is received within the sidewalls (as illustrated in FIG. 1, in cross-section).

Although the Fig illustrates a continuous sidewall 30, it should be appreciated that in some embodiments there may be gaps or apertures in the sidewalls 30.

FIG. 3 schematically illustrates an example where the module 8 is incorporated within a larger apparatus 2.

As described with reference to FIGS. 1 and 2, an internal rigid chassis 20 provides a conductive portion 22 that operates as a ground plane to the antenna 10. FIG. 3 illustrates a galvanic electrical interconnection between the conductive portion 22 of the internal rigid chassis 20 and a ground feed 12 of the antenna 10.

The Fig also illustrates an electronic component 40. In this example, the electronic component is a radio frequency (RF) transceiver component 40. The RF transceiver component 40 is connected to an internally exposed radio frequency feed connector 14 of the antenna 10. In some embodiments the electronic component 40 may be only a receiver or only a transmitter.

The RF transceiver component 40 is, in this example, a heat generating component. An exterior thermally conductive surface of the component 40 is in thermal contact with an exposed portion of the conductive portion 22 of the internal rigid chassis 20. In some embodiments, a thermally conductive bonding material 41 may be used for creating a thermal contact between the component 40 and the chassis 20. In some embodiments, the thermally conductive bonding material 41 may be electrically insulating. The internal rigid chassis 20 is consequentially configured to operate as a heat sink for the heat generating component 40

The whole of, or parts of the conductive portion 22 may be exposed for use as heat sinks. Heat generating components 40 may be thermally bonded to the exposed portion(s).

In some but not necessarily all embodiments, the apparatus 2 may have one or more additional antennas 10' as schematically illustrated in FIG. 3. The additional antennas 10' may be at least partially encapsulated by portions of the sidewalls 30 into which the internal rigid chassis 20 extends.

The internal rigid chassis 20 provides a conductive portion 22 that operates as a ground plane to the antenna 10'. The Fig illustrates a galvanic electrical interconnection between the conductive portion 22 of the internal rigid chassis 20 and a ground feed 12' of the antenna 10'. The RF transceiver component 40 is connected to an internally exposed radio frequency feed connector 14' of the antenna 10'.

FIG. 4 schematically illustrates an example of internal rigid chassis 40 before the sidewalls 30 are formed.

In this example, the internal conductive chassis 20 is substantially planar and extends parallel to an x-y plane. The internal rigid chassis 20 provides a substantially planar conductive portion 22 that extends parallel to an x-y plane.

In the illustrated example, there are a plurality of antennas 10, 10' associated with the internal rigid chassis 20.

In the Fig, a plurality of antennas 10, 10' are positioned at a perimeter of the internal rigid chassis 20.

The internal rigid chassis 20 lies parallel to the x-y plane and the antennas extend in planes orthogonal to the x-y plane.

There is a galvanic electrical interconnection between the conductive portion 22 of the internal rigid chassis 20 and a ground feed of each of the antennas 10, 10'. The conductive portion 22 of the rigid chassis 20 provides a ground plane for the antennas 10, 10'.

In some embodiments one or more ground feeds 12, 12' may not be required for each antenna 10, 10'. For example, a monopole, dipole or balanced loop antenna etc may not require a galvanic connection between the radiator portion of the antenna 10, 10' and a ground plane. However, other antenna types do require a ground feed 12, 12', such as for example, inverted-F antennas (IFAs), planar inverted-F antennas (PIFAs), unbalanced loop antennas, patch antennas, planar inverted-L antennas (PILAs) etc.

The antennas 10, 10' may be extensions of the conductive portion 22 of the internal rigid chassis 20. For example, the antennas 10, 10' and the internal rigid chassis 20 may be formed from a common sheet of metal that is patterned and then deformed. The thickness of the metal sheet may be chosen to provide a desired level of strength and rigidity. The metal sheet may be the same thickness throughout. Alternatively, the portion of the metal sheet that forms the antenna 10 may be thinner than the portion that forms the internal rigid chassis 20.

Alternatively, the internal rigid chassis 20 may be die cast (with or without milling) with the antenna 10 provided as a metal sheet.

Alternatively, the internal rigid chassis 20 may be forged (with or without milling) with the antenna 10 provided as a metal sheet.

The internal rigid chassis 20 may additionally comprise one or more sidewall reinforcement members 32 positioned at the perimeter of the internal rigid chassis 20 and extending in a plane orthogonal to the x-y plane of the internal rigid chassis 20.

In a subsequent processing stage, the internal rigid chassis 20 has external housing sidewalls 30 formed at its perimeter. The sidewalls 30 encapsulate at least a part of each antenna 10, 10' and the perimeter portion of the internal rigid chassis 20. Each of the antennas has a RF feed connector that remains exposed after encapsulation.

The sidewalls 30 may form a unitary non-conductive enclosure around the radiators of the antennas 10, 10', the reinforcement members 32, and the internal rigid chassis 20, so that no conductive material is exposed on an outer surface.

The location of the antennas 10, 10' at the perimeter of the internal rigid chassis 20 may be chosen to obtain optimum RF characteristics.

FIGS. 5 and 6 illustrate an example where the chassis-sidewall-antenna module 8 is integrated into a larger apparatus 2. The apparatus 2 may, for example, be any apparatus that uses radio frequency communication.

Examples of apparatus 2 include, but are not limited to a mobile cellular telephone, a personal electronic device, a gaming device, a computer, a personal digital assistant, a tablet computer etc.

The apparatus 2 may, for example, be a hand-portable apparatus. A hand-portable apparatus is one that is sized to be held in the palm of a hand when in use and which is sized to fit in a jacket pocket or alternatively it may be a portable device such as a tablet or laptop computer, the tablet or laptop computer being sized such that it can be carried under the arm or in a small bag, and in use can be placed on the user's legs or a table.

FIGS. 5 and 6 illustrated an exploded view of the apparatus in which the components of the apparatus 2 are separated for clarity. FIG. 5 provides a perspective view and FIG. 6 provides a cross-sectional view.

The chassis-sidewall-antenna module 8 occupies a central position of the apparatus 2. It provides a rigid skeleton structure that supports and retains other components. It provides the sidewalls 30 of an external housing 11.

The internal rigid chassis 20 extends laterally from within the portion of a first housing sidewall 4 to within the portion of the second housing sidewall 6.

An antenna 10 is at least partially encapsulated by the portion of the first external housing sidewall 4.

In this example, an additional antenna 10' is at least partially encapsulated by the portion of the second external housing sidewall 6 opposing the first external housing sidewall 4.

The rigid chassis 20 provides a ground plane for the antenna 10 and the additional antenna 10'.

The internal rigid chassis 20 has a first upper side 24 and an opposing second lower side 26. The first side 24 of the internal rigid chassis 20 supports one or more components and the second side 26 of the internal rigid chassis 20 supports one or more components.

In the illustrated example, an internal battery 51 of the apparatus 10 is supported by the first side 24 of the internal rigid chassis 20. The battery 51 is sized to fit into a cavity formed between the portions 4, 6 of the sidewalls 30 separated by the internal rigid chassis 20.

When the apparatus 2 is assembled, the internal battery 51 may be in thermal contact with the internal rigid chassis 20 which is used as a heat sink. A thermal bond, as previously described with reference to FIG. 3, may be formed between the internal battery 51 and a conductive portion on the first side 24 of the chassis 20.

In the illustrated example, a circuit board 52, carrying electronic components 40, is supported on the second side 26 of the internal rigid chassis 20. The circuit board 52 is sized to fit into a cavity formed between the portions 4, 6 of the sidewalls 30 separated by the internal rigid chassis 20.

The circuit board 52 may be a flexible or semi-rigid circuit board. The circuit board 52 may be a single-sided board, i.e. the components are only placed on one side of the circuit board 52. The circuit board may be thin compared to multi-layered printed wiring boards which have components placed on both sides. There may be no antennas integrated on the circuit board 5. Instead, each antenna 10 is at least partially encapsulated by an external housing sidewall.

When the apparatus 2 is assembled, one or more of the electronic components 40 carried by the circuit board 52 are positioned between the circuit board 52 and the rigid internal chassis 20 and are in thermal contact with the internal rigid chassis 20 which is used as a heat sink. A thermal bond, as previously described with reference to FIG. 3, may be formed between the components 40 and a conductive portion on the second side 26 of the chassis 20.

One of the components 40 may be a RF component 40 as previously described with reference to FIG. 3 in electrical contact with a feed for the antenna 10 and in electrical contact with a feed for the additional antenna 10'.

The internal rigid chassis 20 comprises buttresses 57 that support the circuit board 52 at a particular separation from the chassis 20. The buttresses 57 are configured to receive connectors 55 for securing the circuit board to the internal rigid chassis 20. The connectors 55 may, for example be threaded screws received in corresponding threaded receptacles provided by the buttresses 57.

A front face component 50 of an external housing 11 of the apparatus 2 is supported by at least an upper surface of the sidewalls 30. In the illustrated example, the portion of the first external housing sidewall 4 has an upper notch that provides an upper surface 62 and the portion of the second external housing sidewall 6 has an upper notch that provides an upper surface 62'. In the illustrated example, the front face component 50 is a touch sensitive display that is supported by at least the upper surfaces 62, 62'.

A rear face component 54 of an external housing 11 of the apparatus 10 is supported by at least a lower surface of the sidewalls 30. In the illustrated example, the portion of the first external housing sidewall 4 has a lower notch that provides a lower surface 63 and the portion of the second external housing sidewall 6 has a lower notch that provides a lower surface 63' In the illustrated example, the back face component 54 is an external cover comprising an aperture 44 for camera imaging, that is supported by at least the lower surfaces 63, 63'.

In the assembled apparatus 2, an external housing 11 of the apparatus 2 is provided by the combination of the sidewalls 30 of the module 8, the front face component 50 and the rear face component 54.

In the assembled apparatus 2, a cavity 45 is defined by an aperture 41 in a battery 51 adjacent the internal rigid chassis 20 and an aligned aperture 9 in the internal rigid chassis 20. The circuit board 52 carries a camera module 42 received in the cavity 45.

In this particular example, the circuit board 52 and the camera module 42 are retained in position by a retainer 53 secured to the internal rigid chassis 20 using the connectors 55. The retainer 53 has an aperture 43 for camera imaging aligned with aperture 44.

The rear face component 54 may have no aperture 44 therein, instead the rear face component 54 may comprise a transparent material such that light passes through, for example, the rear face component 54 may comprise glass or transparent polymer. The rear face component 54 may be completely comprised of a transparent material. The passing of light through at least a portion of the rear face component 54 is required for the camera module 42 to function.

Heat from the internal battery 51 and/or the components 40 of the circuit board 52 is channeled internally to the chassis 20. The chassis 20 is thermally insulated from the user by the sidewalls 30 of the exterior housing 11. Heat is therefore directed away from critical components and stored internally without the user experiencing heat transfer from the apparatus 2 to the user.

The external sidewalls 30 isolate a user from the antennas 10, 10' and help to minimize detuning effects of the user's hand, keeping the resonant frequency of the antenna 10 or antennas 10, 10' more stable and less likely to lose RF power.

The external sidewalls 30 may also provide a peak localized electromagnetic near field value at a frequency, such that the value is lower than for the case where the external sidewalls 30 are not present in the apparatus 2.

The chassis 20 provides an excellent ground plane. There is no need to use the circuit board 52 as a ground plane, which may allow the circuit board 52 to be thinner and therefore the apparatus 2 becomes thinner overall.

FIG. 7 illustrates a method 70. The method 70 schematically illustrates manufacture of a module 8.

At block 72, there is provided a rigid chassis 20 and at least one antenna 10 configured to use the rigid chassis 20 as a ground plane. In some but not necessarily all embodiments of the invention, one or more antennas 10 and the rigid chassis 20 may be formed from a common sheet of metal.

At block 74, a portion of a first external housing sidewall 4 is formed over at least some of said antenna 10 and at least a first extremity of the rigid chassis 20.

At block 76, a portion of a second external housing sidewall 6 is formed over at least a second extremity of the rigid chassis 20.

The rigid chassis 20 consequently extends from within the portion of a first housing sidewall 4 to within the portion of a second housing sidewall 6.

Blocks 74 and 76 may occur simultaneously. For example, injection molding may be used to form the sidewalls 30 including the first sidewall 4 and the second sidewall 6 from plastics.

A RF feed connector of the antenna 10 may remain exposed after injection molding.

At least one conductive portion of the chassis 20 may remain exposed after injection molding for use as a heat sink.

The method 70 may include as an additional block, placing at least one electronic component 40 in thermal contact with a conductive portion 22 of the rigid chassis 20.

The one or more antennas 10, 10' may each be used for reception only, for transmission only or for both transmission and reception.

Each antenna has an operational bandwidth. Operational bandwidth is a frequency range over which an antenna can efficiently operate. Efficient operation occurs, for example, when the antenna's insertion loss S11 is greater than an operational threshold such as 4 dB or 6 dB.

The operational bandwidth of an antenna may cover one or more of the following radio frequency bands: AM radio (0.535-1.705 MHz); FM radio (76-108 MHz); Bluetooth (2400-2483.5 MHz); WLAN (2400-2483.5 MHz); HLAN (5150-5850 MHz); GPS (1570.42-1580.42 MHz); lower cellular (824-960 MHz), US-GSM 850 (824-894 MHz); EGSM 900 (880-960 MHz); EU-WCDMA 900 (880-960 MHz); upper cellular 1710-2180 MHz), PCN/DCS 1800 (1710-1880 MHz); US-WCDMA 1900 (1850-1990 MHz); WCDMA 2100 (Tx: 1920-1980 MHz Rx: 2110-2180 MHz); PCS1900 (1850-1990 MHz); UWB Lower (3100-4900 MHz); UWB Upper (6000-10600 MHz); DVB-H (470-702 MHz); DVB-H US (1670-1675 MHz); DRM (0.15-30 MHz); Wi Max (2300-2400 MHz, 2305-2360 MHz, 2496-2690 MHz, 3300-3400 MHz, 3400-3800 MHz, 5250-5875 MHz); DAB (174.928-239.2 MHz, 1452.96-1490.62 MHz); RFID LF (0.125-0.134 MHz); RFID HF (13.56-13.56 MHz); RFID UHF (433 MHz, 865-956 MHz, 2450 MHz); LTE 700 (US) (698.0-716.0 MHz, 728.0-746.0 MHz), LTE 1500 (Japan) (1427.9-1452.9 MHz, 1475.9-1500.9 MHz), LTE 2600 (Europe) (2500-2570 MHz, 2620-2690 MHz).

As used here 'module' refers to a unit or apparatus that excludes certain parts/components that would be added by an end manufacturer or a user.

The illustration of a particular order to the blocks in FIG. 7 does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a rigid internal chassis, said rigid internal chassis being of a conductive material with a heat-sink capability;
   an antenna integrally formed with the rigid internal chassis as an extension of the rigid internal chassis at a perimeter thereof, said rigid internal chassis providing a ground plane for the antenna, and said antenna being substantially perpendicular to the ground plane; and an external sidewall, the external sidewall being of an insulating material, said external sidewall at least partially encapsulating the antenna and extending around the perimeter of the rigid internal chassis, further encapsulating at least an edge thereof, so that the rigid internal chassis extends laterally between opposite portions of the external sidewall.

2. The apparatus of claim 1, wherein the rigid internal chassis extends laterally in an x-y plane and the antenna lies orthogonal to the rigid internal chassis.

3. The apparatus of claim 1, wherein the external sidewall at least partially encapsulates a second antenna.

4. The apparatus of claim 3, wherein the antenna and the second antenna oppose one another.

5. The apparatus of claim 1, wherein the rigid internal chassis includes a conductive portion.

6. The apparatus of claim 5, wherein the rigid internal chassis supports a battery in thermal contact with the rigid internal chassis.

7. The apparatus of claim 1, wherein the rigid internal chassis supports a circuit board carrying electronic components.

8. The apparatus of claim 1, wherein the rigid internal chassis further comprises one or more sidewall reinforcement members positioned at a perimeter of the rigid internal chassis and extending in a plane orthogonal to an x-y plane of the rigid internal chassis.

9. The apparatus of claim 1, further comprising an external housing having a front face component supported by an upper surface of the external sidewall.

10. The apparatus of claim 9, further comprising a rear face component supported by a lower surface of the external sidewall.

11. A portable electronic device comprising the apparatus of claim 1.

12. A hand-portable device comprising the apparatus of claim 1.

13. A method comprising:
providing an antenna integrally formed with a rigid internal chassis as an extension of the rigid internal chassis at a perimeter thereof, said rigid internal chassis being of a conductive material with a heat-sink capability; and
at least partially encapsulating said antenna within an external sidewall of an insulating material to form at least part of the external sidewall extending around the perimeter of the rigid internal chassis and encapsulating at least an edge thereof, said antenna using the rigid internal chassis as a ground plane, so that the rigid internal chassis extends laterally between opposite portions of the external sidewall.

14. The method of claim 13, further comprising:
forming a unitary nonconductive enclosure comprising the external sidewall.

15. The method of claim 13, wherein the rigid internal chassis is a metal sheet.

* * * * *